United States Patent

Wasmuht et al.

[11] Patent Number: 5,865,093
[45] Date of Patent: Feb. 2, 1999

[54] APPARATUS FOR HEATING UP WORT DURING BREWING

[75] Inventors: Klaus-Karl Wasmuht, Ellingen; Kurt Stippler, Marzling, both of Germany

[73] Assignee: Anton Steinecker Maschinenfabrik, Freusubg-Attaching, Germany

[21] Appl. No.: 863,379

[22] Filed: May 27, 1997

[30] Foreign Application Priority Data

May 30, 1996 [DE] Germany .................. 296 09 642.3

[51] Int. Cl.⁶ .................................................. C12C 7/00
[52] U.S. Cl. .............................................. 99/278; 99/276
[58] Field of Search .................. 99/276, 277, 277.1, 99/277.2, 278

[56] References Cited

U.S. PATENT DOCUMENTS

| | | | |
|---|---|---|---|
| 2,555,938 | 6/1951 | Seligman et al. | 99/276 |
| 4,836,097 | 6/1989 | Tretter | 99/277.1 |
| 5,522,305 | 6/1996 | Widhopf | 99/276 |

FOREIGN PATENT DOCUMENTS 3819355  12/1989  Germany ................. 99/278

*Primary Examiner*—Reginald L. Alexander
*Attorney, Agent, or Firm*—Seed and Berry LLP

[57] ABSTRACT

The present invention relates to an apparatus for heating up wort during brewing. For a simple and inexpensive force-type circulation of wort during the heating or boiling process preceding the hop adding step, the present invention suggests a connection pipe which is branched off from the casting pipe downstream of the casting pump and terminates again in the vessel underneath the inner boiler for heating wort. Furthermore, there is provided at least one respective shut-off device in the casting pipe and the connection pipe downstream of the casting pump.

6 Claims, 2 Drawing Sheets

APPARATUS FOR HEATING UP WORT DURING BREWING

TECHNICAL FIELD

The present invention relates to an apparatus for heating up wort during brewing in a vessel which comprises an inner boiler.

BACKGROUND OF THE INVENTION

During the brewing process, wort is heated up and boiled after the lautering process for increasing the concentration of the wort in a desired manner by evaporating superfluous water. Moreover, enzymes are destroyed in this process and the wort is made sterile. This heating process can, for instance, be carried out in a so-called wort kettle. While wort is being boiled in the wort kettle, hop is added to the wort in a desired concentration and at a predetermined time, with the hop releasing its bitter substances to the wort. After completion of this process the wort is pumped for further processing purposes with the aid of a wort casting pump, for instance, into a whirlpool tank in which the hot break is deposited.

The processes which are carried out in the wort kettle, i.e., mainly the heating, boiling and hopping of wort, as well as the processes which are carried out in the whirlpool tank, can also be performed in a combined wort kettle and whirlpool apparatus. After the hot break has been separated, the clear wort is pumped out from this combined tank with the aid of a wort casting pump for further processing.

To avoid idle times which occur before the wort is introduced into the wort kettle or into the combined vessel, one or a plurality of pre-run vessels are often used in cases where a large number of brews are to take place in succession on a single day. A boiling device which serves to heat the wort is here positioned within such a pre-run vessel. After the wort has been heated up in a pre-run vessel, it is pumped into the wort kettle or into the combined wort kettle and whirlpool apparatus with the aid of a casting pump.

So-called inner boilers, specifically inner tube-type boilers, are often used for heating up the wort in such vessels. Such an inner tube-type boiler is described in patent specification DE 43 04 383 C1 for use in a wort kettle. The inner boiler is centrally supported on the bottom of the wort kettle, for instance, on supports. The wort can then pass under the boiler and is driven upwards inside the tube-type boiler. It exits from the tube-type boiler at the upper end thereof and is distributed again, for instance, by a baffle plate into the wort kettle. Heating operations within a pre-run vessel or in a combined wort kettle and whirlpool tank take place in a similar manner when such an inner boiler is used.

During the heat-up operation in the vessel the wort temperature is not homogeneous. Before the temperature gradient inside the vessel has been substantially compensated for, the inner boiler will overheat its contents, thereby ejecting the contents upwardly at intervals. The wort circuit during the heating operation is thus dicontinuous. It may however happen during this overheating process that deposits are formed on the inner wall of the boiler by the wort because of the low flow rate. This will decrease the service life of the inner boiler and impair the quality of wort.

A circulating circuit has therefore been suggested in patent specification DE 43 04 383 C1 for a wort kettle. The circulating circuit is arranged outside the wort kettle. Wort is laterally withdrawn from the wort kettle and is again introduced from below into the wort kettle underneath the inner tube-type boiler with the aid of a circulating pump. It is in this way that the wort can be force-circulated, and an interval-like ejection and overheating of the wort, specifically during the heating phase, can be avoided.

A large number of technical devices are needed for this external circulating pipe. For instance, an additional pump of adequate capacity, namely a circulating pump, must be provided for.

SUMMARY OF THE INVENTION

Starting from this prior art, it is therefore the object of the present invention to provide an apparatus which in the wort kettle, in a pre-run vessel, or in a combined wort boiling and whirlpool device, permits a forced circulation of the wort during the heating or boiling process prior to the addition of hop, which apparatus is simplified in comparison with the prior-art apparatus and permits an inexpensive design and operation.

According to the present invention there is provided a connection pipe which is branched off from the wort casting pipe downstream of the casting pump of the vessel and terminates again in the vessel underneath the inner boiler for heating wort. In addition, at least one respective shut-off device is provided in the casting pipe and in the connection pipe downstream of this bifurcation.

The apparatus of the invention for heating wort during brewing manages, in particular, without the use of an additional circulating pump. For circulation purposes the casting pipe leading out of the wort vessel is used in part by exploiting the already existing casting pump. This casting pump has already been given an adequately great pumping capacity because of its original function. Additional pumps or safety devices are not needed in connection with such pumps. Hence, the apparatus is much simpler and less expensive than an additional circulating pipe, including a circulating pump, and can be installed in a space-saving manner.

The apparatus of the invention for heating wort can be used in a wort kettle, a whirlpool tank, a combined wort kettle and whirlpool apparatus and for pre-run vessels.

The shut-off possibilities which are offered in the pipes downstream of the bifurcation can be provided by individual valves or also by a three-way cock.

According to an advantageous development of the invention, the connection pipe partly forms part of a hop dosing means and the casting pump is a combined casting and hop dosing pump.

With such a design it is possible to use also pipes of the hop dosing means and to manage without an additional hop dosing pump.

BRIEF DESCRIPTION OF THE DRAWINGS

The apparatus of the invention will now be explained with reference to the figures, in which.

DETAILED DESCRIPTION OF THE INVENTION

An apparatus of the invention for boiling wort will now be described in detail hereinafter. The example regards a wort kettle in which wort is heated and boiled. However, the apparatus of the invention can just as well be used in a pre-run vessel or in a combined wort boiling/whirlpool apparatus.

Figure 2:
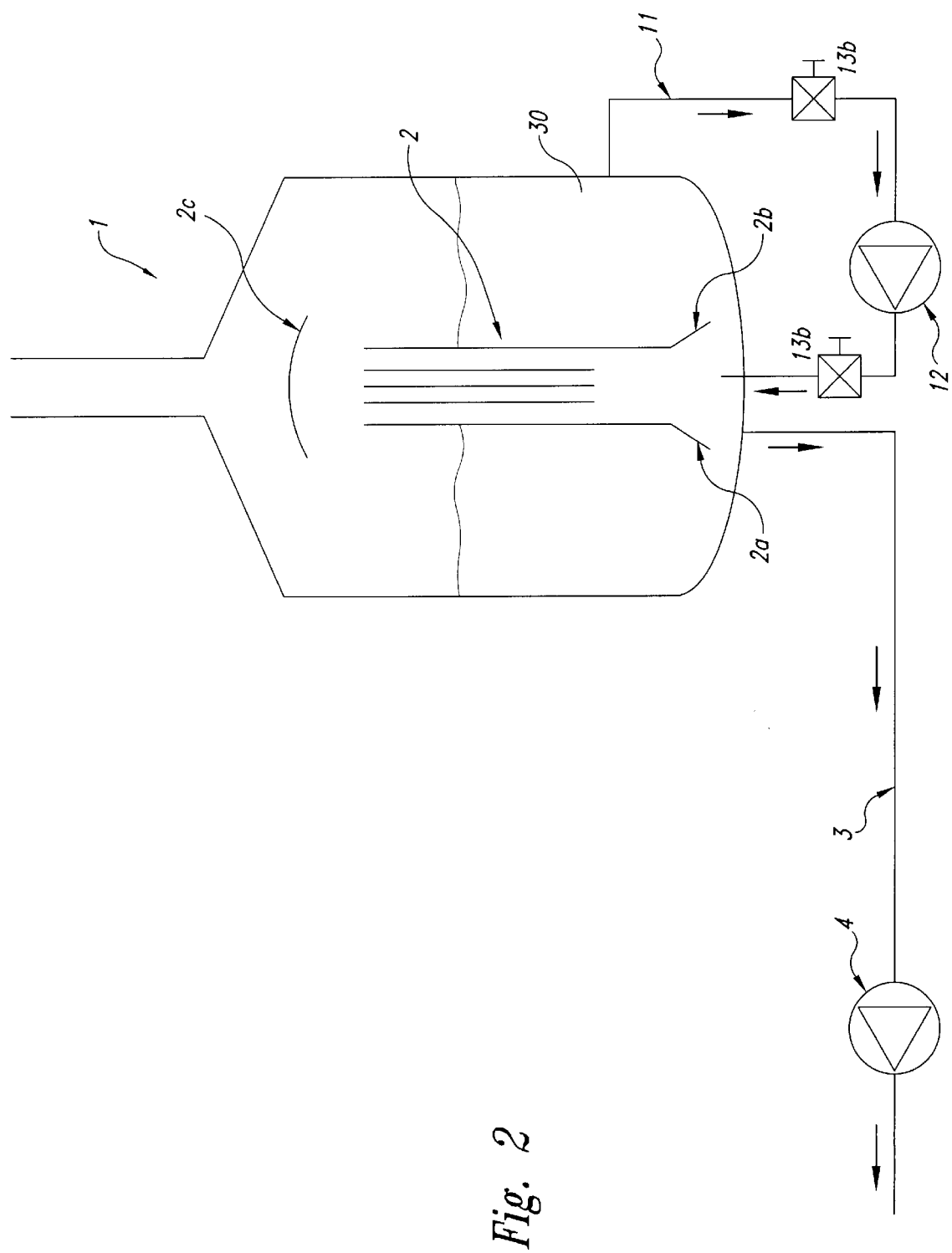
FIG. 2 diagrammatically shows a conventional apparatus for heating wort.

With reference to FIG. 2, the heating process in a conventional apparatus will now be described as follows: Wort 30 is introduced through a supply pipe (not shown) into the wort kettle 1. An inner tube-type boiler 2, which is e.g. supported on supports 2a, 2b, is centrally positioned inside the wort kettle 1. Wort 30 can pass under this inner boiler and will be drawn upwards by the heating action of the tubes which are positioned inside the boiler. When leaving the tube-type boiler 2, the wort is again distributed into the wort kettle, for instance, by means of a baffle plate 2c. After hop has been added with the aid of a hop dosing device (not shown) to the wort, in this specific case: to the wort kettle, the wort is pumped off through a casting pipe 3 with the aid of a casting pump 4. The wort will then pass, for instance, into the whirlpool tank to be further processed.

During the heating process, specifically at the beginning of the wort heating process, there is a temperature gradient inside the vessel, which has the effect that a uniform, linear wort heating process cannot take place in the wort kettle 1. It may happen that the wort is ejected from the tube-type boiler 2 at intervals, with the low flow rate possibly leading to deposits inside the tube-type boiler, which may again impair the service life of the tube-type boiler and the quality of the wort. Wort is therefore withdrawn via a circulating circuit 11 laterally from the wort kettle 1 and again introduced from below underneath the inner tube-type boiler 2 into the wort kettle. Corresponding shut-off valves 13a, 13b and a circulating pump 12 are disposed within the circulating circuit 11. Corresponding safety devices, such as pressure relief valves, must additionally be provided for in the circulating pump.

Figure 1:
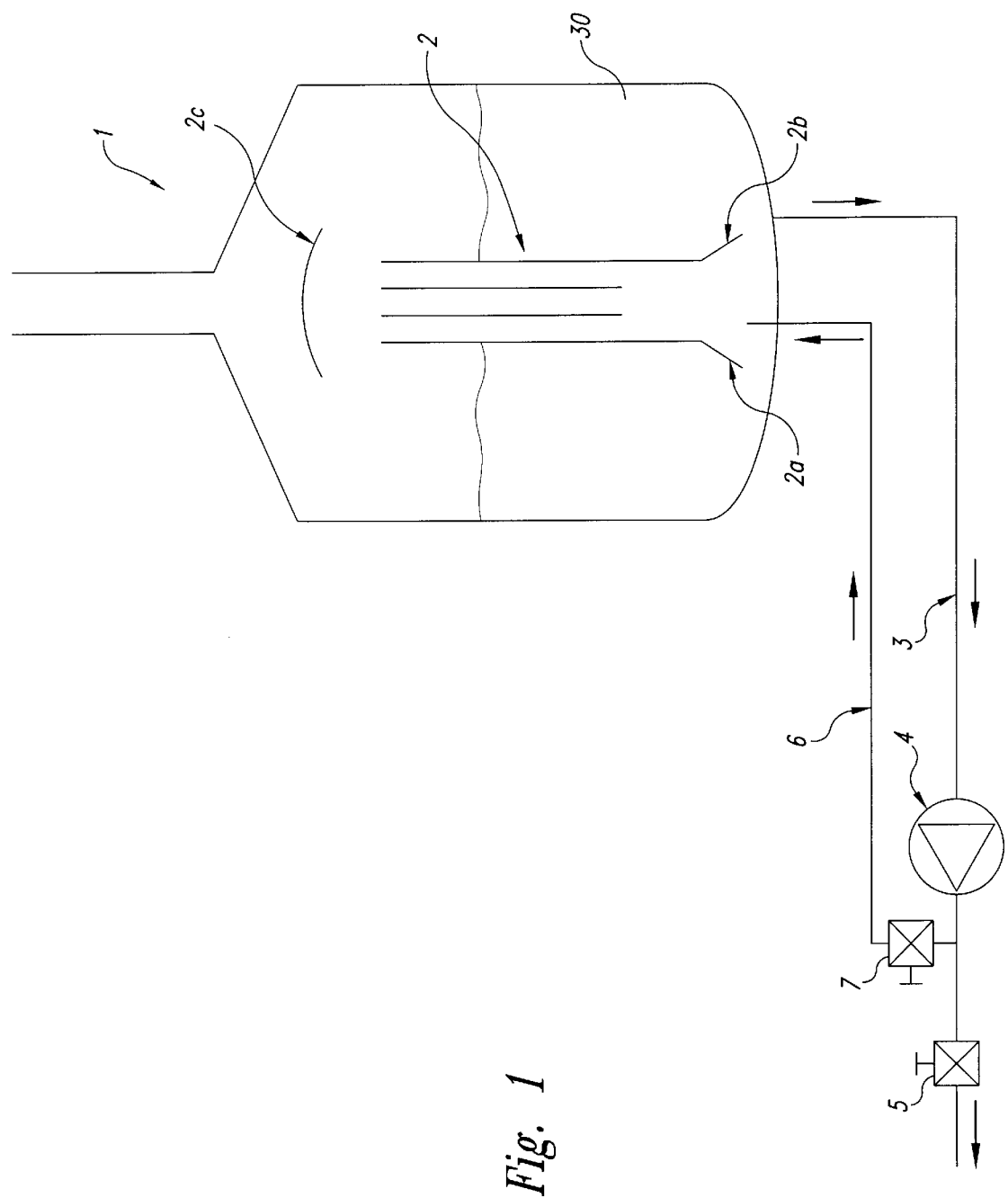
FIG. 1 diagrammatically shows an apparatus of the invention for wort heating.

In contrast to this conventional apparatus shown in FIG. 2, FIG. 1 illustrates an apparatus of the invention which is used for heating wort. Reference numerals which describe the same devices as in FIG. 2 have not been changed. A separate circulating pipe 11 with a corresponding pump 12 and valves 13a, b is not provided for. A connection pipe 6 is branched off downstream of the casting pump 4 into the casting pipe 3. This connection pipe leads again into the wort kettle 1 underneath the inner tube-type boiler 2. It can be shut off with the aid of a shut-off valve 7. In addition, a shut-off valve 5 is again provided downstream of this bifurcation in the casting pipe.

Instead of the two shut-off valves 5 and 7, there may be provided a corresponding three-way cock at the bifurcation of pipe 6 and pipe 3.

The wort is circulated, specifically during the heating phase, with the aid of the apparatus of the invention by means of the casting pump 4 in the closed state of the shut-off valve 5 and and in the opened state of the shut-off valve 7. The wort is withdrawn from the wort kettle and directly introduced again underneath the tube-type boiler where it is driven upwards by the hot tube-type boiler. This repumping movement of the wort effects a forced circulation which prevents the wort from depositing or getting firmly stuck inside the tube-type boiler due to burning.

When the wort is to be pumped off from the vessel 1, the shut-off valve 7 is closed, the shut-off valve 5 is opened and the wort is pumped with the aid of the casting pump 4 through the casting pipe 3 for further processing.

It might also be that the connection pipe 6 partly forms part of the hop dosing means, which is not shown in the enclosed figures. According to this embodiment correspondingly introduced valves make it possible that the existing pipes can be opened or shut off such that a circulation without the addition of hop is possible, that hop can be added or that the wort can be cast from kettle 1. In this embodiment the casting pump 4 fulfills not only the additional function of a circulating pump, but also functions as a hop dosing pump.

With the aid of the apparatus of the invention it is possible to circulate the wort in a much cheaper and easier manner during the heating or boiling process in a vessel which serves to heat wort during brewing. Such a vessel may, for instance, be a wort kettle, a pre-run vessel or a combined wort boiling and whirlpool apparatus. An additional circulating circuit with an additional pump is not needed. Hence, the present invention permits an inexpensive construction and operation.

We claim:

1. An apparatus for heating wort during brewing comprising:
   a vessel;
   an inner boiler in the vessel;
   a casting pipe connected to the vessel;
   a casting pump connected to the casting pipe;
   a connection pipe connected at one end to the casting pipe downstream of the casting pump and terminates at another end in the vessel below the inner boiler, and at least one shut-off device positioned inside one of said casting pipe and said connection pipe downstream of said casting pump.

2. The apparatus for heating wort according to claim 1, wherein said vessel is a pre-run vessel and said casting pipe leads to a wort kettle or to a combined wort boiling and whirlpool apparatus.

3. The apparatus for heating wort according to claim 1, wherein said vessel is a wort kettle and said casting pipe leads to a whirlpool system.

4. The apparatus for heating wort according to claim 1, wherein said vessel is a combined wort boiling and whirlpool apparatus.

5. The apparatus for heating wort according to any one of the preceding claims, wherein the at least one shut-off device is formed by a combined three-way valve.

6. The apparatus for heating wort according to claim 1, wherein said connection pipe partly forms part of a hop dosing means and said casting pump is a combined casting and hop dosing pump.

* * * * *